United States Patent [19]

Randmere

[11] 3,970,786
[45] July 20, 1976

[54] LOUDSPEAKING TELEPHONE WITH IMPROVED RECEIVE SENSITIVITY

[75] Inventor: Uno Randmere, Victor, N.Y.

[73] Assignee: Stromberg-Carlson Corporation, Rochester, N.Y.

[22] Filed: Oct. 21, 1974

[21] Appl. No.: 516,333

Related U.S. Application Data

[63] Continuation-in-part of Ser. No. 483,591, June 27, 1974.

[52] U.S. Cl. .............................. 179/1 VC; 179/1 HF
[51] Int. Cl.² ....................... H04M 1/60; H04M 9/08
[58] Field of Search ............... 179/1 VC, 1 HF, 1 H, 179/1 P

[56] References Cited
UNITED STATES PATENTS

| | | | |
|---|---|---|---|
| 3,610,835 | 10/1971 | Reed | 179/1 VC |
| 3,660,603 | 5/1972 | Anderson | 179/1 VC |
| 3,725,585 | 4/1973 | Moniak et al. | 179/1 HF |
| 3,751,602 | 8/1973 | Breeden | 179/1 HF |

FOREIGN PATENTS OR APPLICATIONS 668,858  3/1952  United Kingdom .............. 179/1 VC Primary Examiner—William C. Cooper
Assistant Examiner—E. Matt Kemeny
Attorney, Agent, or Firm—William F. Porter, Jr

[57] ABSTRACT

An improved loudspeaking telephone system including voice switching is disclosed. The system is bistably voice controlled by inversely regulating the impedances of variolossers in the transmit and receive channels, respectively. Hysteresis is added to the bistable control by the summation of receive and transmit signals across a plurality of unequal impedances that form part of an input control means. Circuitry forming the input control means also includes transmit noise guard circuit means useful in discriminating between ambient noise signals and syllabic speech signals. Further, a novel receive noise guard circuit means is used to discriminate between syllabic speech signals and high level noise transmissions from another station. The outputs of both the transmit and the receive noise guard circuit means are summed with the transmit and receive signals across unequal impedances to prevent seizure of the bistable control by ambient noise and to improve the receive channel sensitivity.

5 Claims, 5 Drawing Figures

LOUDSPEAKING TELEPHONE WITH IMPROVED RECEIVE SENSITIVITY

BACKGROUND OF THE INVENTION

The present application is a continuation-in-part of a copending application entitled, "Loudspeaking Telephone Hysteresis and Ambient Noise Control;" filed June 27. 1974, Ser. No. 483,591, in the names of Uno Randmere and Morris Suntop and assigned to the assignee of the present invention; the disclosure of which is herein incorporated by reference.

The invention relates generally to loudspeaking telephones and is particularly directed to providing improved receive channel sensitivity in bistable controls of loudspeaking telephones.

A problem in prior art voice controlled loudspeaking telephones with hysteresis has been poor overtake performance. Mainly the problem is caused by ambient noise which conflicts with the receiver channel signal for seizure of the bistable control. The ambient noise may hold the circuitry in the transmission mode even though transmission has been completed by the transmitting party and the receiving party begins talking. The copending application, referenced above, advantageously addresses the overtake problem in the transmit channel by providing a noise guard means that substantially cancels an ambient noise parameter from the bistable control.

However, it was recognized in the copending application that the receive channel signal also contains some undesirable parameters included with the received syllabic intelligence. One of these undesirable receive parameters is caused by hybrid leakage into the receive channel from the transmission of intelligence. In the copending application, the effects of the leakage parameter on the receive channel sensitivity were minimized by selection of an impedance in the hysteresis circuit of the input control means.

However, another unwanted parameter in the receive signal is the noise that is received with the intelligence transmitted from another station. This noise may be from line disturbances of the transmission medium or it may occur as the ambient noise of the connected station.

Since both of these unwanted parameters are variable in nature and generally unpredictable, the performance of a fixed gain cancellation parameter provided in the system disclosed in the copending application may be improved on in some applications by a variable gain parameter that tracks the receive noise more closely thereby providing a novel method for cancelling the ambient and hybrid noise parameters in the receive channel to improve receive control sensitivity.

SUMMARY OF THE INVENTION

The invention provides an improved input control means for a loudspeaking telephone system with improved receive channel control sensitivity. As is more fully explained in the referenced copending application, the input control circuit means disclosed therein includes means for providing seizure commands by comparing transmit and receive levels in summing circuitry and circuit means for providing a bistable control output depending on which level is greater.

One summing means performs an analog addition of the transmit and receive signals formed by peak detecting means across unequal impedances, while the other summing means performs an identical analog addition across impedances equal in value but oppositely connected. Thus, each summing means of a junction has impedances of $Z1$ and $Z2$ where the transmit signal is connected to $Z1$ on the one summing junction and to $Z2$ on the other, while the receive signal is connected to the $Z2$ on the first junction and $Z1$ on the other.

Transmit noise guard circuit means are also provided in the referenced copending application. This feature allows the input control means to recognize the difference between ambient noise and syllabic speech and to prevent the holding of the transmit channel by ambient noise.

The present invention provides an improved input control circuit means by including a receive channel noise guard means. The receive noise guard circuit means is useful in cancelling the unwanted parameters from the receive channel signal and providing improved receive channel sensitivity. While the transmit noise guard circuit means allows the loudspeaking telephone increased operating range in high ambient noise environments, the receive noise guard circuit means allows the system to function in environments in which the lines have a high noise coefficients and the ambient noise of the connected station is excessive for many loudspeaking telephone systems.

The invention further provides for means for summing the transmit and receive noise guard means signals in the junctions connected by the unequal impedances. This feature produces the hysteresis necessary for bistable control of the system and is accomplished by cross connecting the transmit and receive noise guard circuit means to the junctions similar to the connections for the transmit and receive peak detectors.

Thus, each summing junction has additional impedances $Z3$ and $Z4$ equal to $Z$ and $Z2$, respectively, and the transmit noise guard circuit means is connected to $Z3$ on the first junction and to $Z4$ on the other junction, while the receive noise guard circuit means is connected to $Z4$ on the first junction and to $Z3$ on the second.

Accordingly, it is an object of the present invention to provide an improved input control circuit means for a loudspeaking telephone.

Another object of the invention is to provide a control input circuit means with improved receive channel sensitivity.

A still further object of the invention is to substantially increase the operating range of loudspeaking telephones in environments with high levels of receive noise.

Many other objects, features and advantages of the present invention will be clearer and more fully understood from the following detailed description of a preferred embodiment thereof, when read together with the appended drawings 1–5 wherein:

DETAILED DESCRIPTION OF THE PREFERRED EMBODIMENT

Figure 1:
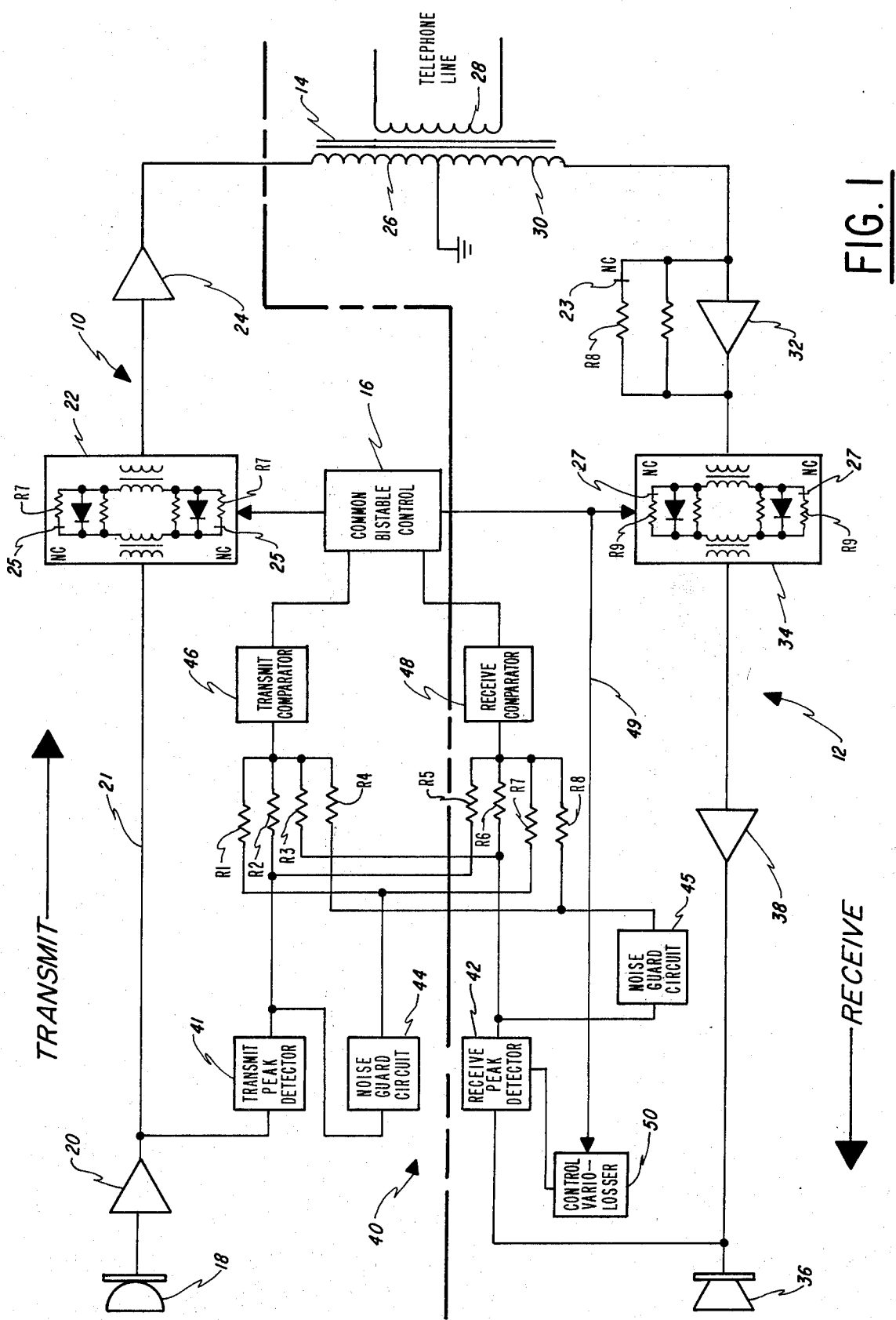
FIG. 1 is a diagram, partially in block form and partially in schematic form, of a loudspeaking telephone system with bistable voice control constructed in accordance with the present invention.

Referring now to FIG. 1, there is shown a loudspeaking telephone system including a transmission channel, generally designated 10, and a receive channel, generally designated 12. Both channels 10 and 12 share a hybrid line transformer 14 and a common bistable control circuit 16 (the operation of both of which will be discussed in greater detail below).

The transmission channel 10 includes a microphone 18 which drives a microphone pre-amplifier 20 which amplifies the voltage output of the microphone 18. The output of the pre-amplifier 20 is transmitted via a line 21 to transmit variolosser (TVL) 22, the impedance of which is variable with respect to a control signal from the bistable control circuit 16 and dependent upon the state or operational mode of the bistable control circuit 16. The TVL 22 has parallel impedances R7 balanced and selectively switchable into the TVL circuit. The output of the TVL 22 is amplified by a current amplifier 24 which produces a sufficient current and power increase to drive the input secondary winding 26 of the hybrid 14. The output signal of the hybrid 14 is propagated to the telephone line and central switching equipment (not shown) by the primary windings 28 of the hybrid 14.

Conversely, signals to be received from the telephone line by the receiver channel 12 are transmitted through the hybrid 14 to output secondary windings 30. The output of secondary windings 30 is amplified by voltage amplifier 32 (the gain of which may be varied by selectively switching an impedance R8 in and out of parallel with the amplifier 32) and applied to a receive variolosser (RVL) 34, the impedance of which is variable with respect to a control signal from the bistable control circuit 16 and dependent upon the state or operational mode of the bistable control circuit 16. The RVL 34 also includes parallel impedances R9 balanced and selectively switchable into the RVL circuit. The output of the RVL 34 is transmitted to a speaker amplifier 38 which drives a speaker 36.

Associated with the bistable control circuit 16 are control input circuit means generally designated 40 (including transmit and receive peak detectors 41 and 42, respectively, transmit and receive noise guard circuits 44 and 45, respectively, transmit and receive comparators 46 and 48 and a control variolosser 50, all connected as shown) for controlling the state of the bistable control circuit 16. The control input circuit means 40 determines the state to which bistable control circuit 16 will make a transition by processing signals from the transmission and receive channels 10, 12.

Signals in the transmission channel 10 are sampled at the output of the microphone pre-amplifier 20 by the transmit peak detector 41 and signals in the receive channel are sampled at the output of the speaker amplifier 38 by the receive peak detector 42. Further, a transmit noise guard signal is developed (as will be discussed in greater detail below) from the output of the transmit peak detector 41 by a transmit noise guard circuit 44 and a receive noise guard signal is developed from the output of the receive peak detector 42 by a receive noise guard circuit 45.

The outputs of the receive peak detector 42, transmit peak detector 41, and noise guard circuits 44, 45 are summed across a transmit summing circuit R3, R2, R1 and R4, respectively, to define the input to a transmit comparator circuit 46 and across a receive summing circuit R6, R5, R7, R8, respectively, to define the input to a receive comparator circuit 48.

The common bistable control circuit 16 receives inputs from the transmit comparator 46 and from the receive comparator 48, and switches between transmit and receive modes depending upon which of the comparators 46 and 48 has generated a seizure command. The bistable control circuit 16 also has an output via a line 49 which actuates the control variolosser 50 to switch the gain of the receive peak detector 42 between values corresponding to the transmit and receive modes, respectively, of the control.

The detailed system operation may be advantageously understood by describing the transition of the system from a transmitting state to a receiving state.

When the system is operating in a transmitting state, the bistable control circuit 16 has an output which causes the TVL 22 to insert a low loss into the transmit channel 10 and cause the RVL 34 to insert a high loss into the receive channel 12. The loss difference between high and low for the variolossers 22, 34 is approximately 23 db. The control signal from the bistable control circuit 16 (transmitted via the control variolosser 50) also increases the gain of the receive peak detector 42 by an amount comparable to that lost through the RVL 34 to retain the sensitivity of the control input circuits 40.

When the system is in the transmission state, signals from the microphone are readily propagated through the transmission channel 10 while the receive channel is essentially muted. To provide for transition of the bistable control circuit 16 into the receive state, the control input circuit means 40 compares the levels of the signals present in the transmit and receive channels 10, 12 and determines when the level of signals on the receive channel is great enough for a state change. The levels of the receive and transmit signals that are directly compared in summing circuits R1–R4, R5–R8 are developed by the peak detectors 41, 42 which sample the transmit and receive signals from the transmission and receiving channels 10, 12, respectively, and have outputs that are combined by analog addition in the summing circuits R1–R4, R5–R8. The levels produced are substantially related to the peak voltage of each signal and follow the peak signals relatively closely. The ability to follow the rapidly variable transmit and receive audio signals is related to the attack and release times of the peak detectors 41, 42 which are nominally less than 15 milliseconds attack and 350 ±50 milliseconds release time.

The transmit and receive levels, which are of opposite polarity, are then summed across unequal impedance R2, R3 to provide an input for the transmit comparator circuit 46 and across unequal impedances R5, R6 to provide an input for the receive comparator circuit (where $R2 \neq R3$ and $R2 = R6$, $R3 = R5$). These unequal impedances produce a hysteresis that is proportional to the ratio between R2 and R3 by the analog addition of the transmit and receive signals across the summing means R1–R4, R5–R8. The hysteresis produced by the impedances is recognized as an overtake differential by the comparators 46, 48. Each comparator 46, 48 takes the analog sum of the input signals thereto and produces a seizure command only if the signal developed by the summing means R1–R4, R5–R8 to seize the bistable control circuit 16 exceeds the controlling level by the overtake differential. The seizure command is the signal that produces the mode transition of the bistable control circuit 16.

For example, to switch the system into a receiving mode with a nominal hysteresis of 5 (R6 = 5R5) and a transmit signal of 0.5 volt the input to the receive comparator circuit 48 must be a receive level greater than 2.5 volts before a receive seizure command will be given. Only the receive comparator 48 may seize the system for receiving and, likewise, only the transmit comparator 46 may seize the system for transmission.

The transmit noise guard circuit 44 substantially eliminates the ambient noise parameter from the transmit level produced at the transmit peak detector 41 by inverting the output of the transmit peak detector 41 and transmitting the inverted signal to the transmit summing means R1–R4 via R1.

When there are no audio signals transmitted by the microphone 18, the transmit signal is substantially cancelled by the combination of impedances R1, R2, which are equal, because it is produced only by ambient noise. However, when audio signals are present in the transmit channel, the peak detector 41 follows the waveform rapidly, while the output of the transmit noise guard circuit 44 is relatively unchanged because its attack time is much greater than that of the peak detectors 41, 42. The nominal rate is two sec ± ½ sec for attack and less than 10 milliseconds for release. The transmit noise guard circuit 44, which takes advantage of the fact that voice signals are normally louder than ambient noise signals, thus provides a facile method and apparatus for eliminating the noise parameter from the control circuitry in effecting a transmit seizure.

The receive noise guard circuit 45 operates in a similar manner to cancel the unwanted receive parameters by inverting the output of the receive peak detector 42 and transmitting the inverted signal to the receive summing means R5–R8 via R8.

When there are no audio inputs to the speaker 36, the output of the receive peak detector 42 is due mainly to line noise or the ambient noise of the connected station. The combination of R6, R8 will substantially cancel this noise from the receive summing means R5–R8. However, when the connected station transmits audio signals, the receive peak detector 42 follows the waveform rapidly while the output of the receive noise guard circuit 45 is relatively unchanged because its attack time is much greater than that of the peak detector 42. The nominal rate is two sec ± ½ sec for attack and less than 10 milliseconds release.

Likewise when the system is in the transmitting state, the receive noise guard circuit means 45 substantially cancels the hybrid leakage parameter that becomes part of the output of the receive peak detector 42. Thus, it is seen the receive noise guard circuit 45, which takes advantage of the fact that voice signals are normally louder than noise signals, provides a facile method and apparatus for substantially cancelling both the unwanted noise and hybrid parameters from the receive channel to improve receive control sensitivity.

The outputs of the transmit and receive noise guard circuits 44, 45 respectively, are also cross connected to the opposite summing junctions to retain the hysteresis developed via impedances R5, R4 by the cross connection of the transmit and receive peak detectors 41, 42 to unequal impedances.

The system also includes provision for loud and soft control by increasing the gain of the receiver channel 12 by depressing "loud" and "soft" switches (not shown) without significant loss of performance due to loop gain changes. The receiver gain is increased by opening a normally closed contact 23 in order to remove the impedance R8 from the receiver amplifier circuit 32 thereby increasing the amplifier gain by a nominal 10 db. Simultaneously with this operation, additional 10 db losses are inserted into the variolossers TVL 22, RVL 34 by opening normally closed contacts 25, 27 and removing parallel impedances R7, R9, respectively, from the respective variolosser circuits 22, 34. System stability is maintained since the receiver gain is cancelled by the additional loss in the TVL 22 when in the receiving mode and by the additional loss in the RVL 34 when in the transmission mode. The normally closed contacts 23, 25, 27 may be any type of simultaneously operating SP5T switch, such as relay contacts of a control relay (not shown).

Figure 2:
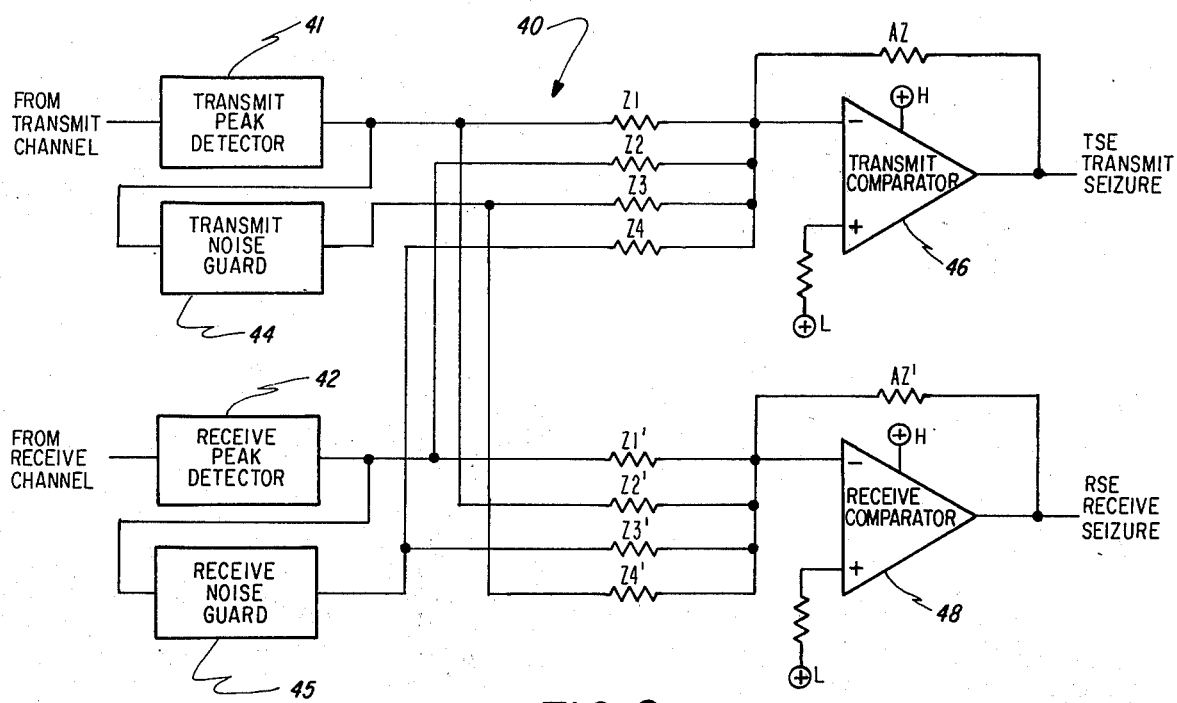
FIG. 2 is a diagram of a control input circuit means of the bistable voice controlled loudspeaking telephone illustrated in FIG. 1.

Referring now to FIG. 2, the hysteresis and operation of the input control circuit means 40 will be more fully explained. The input control circuit means 40 extracts signals from the receive and transmit channels and produces seizure commands TSE (transmit seizure) and RSE (receive seizure). The bistable control circuit 16 is set to the transmit state when the output of the control input circuit means 40 is +TSE and makes a state transition to the receive mode when the output of the input control circuit means is −RSE.

Therefore, if $Z1 \neq Z2, Z1 > Z2, Z1 = Z1' = Z3 = Z3'$ and $Z2 = Z2' = Z4 = Z4'$ TS = the transmit signal
RS = the receive signal
TN = the transmit noise signal
RN = the receive noise signal
A = A' gain of the comparators 46, 48, then the magnitude of the signal TSE is given by the equation:

$$TSE = -AZ1 \left( \frac{-TS - TN}{Z1} + \frac{TN}{Z3} + \frac{RS + RN}{Z2} + \frac{-RN}{Z4} \right) \quad (1)$$

$$TSE = -AZ1 \left( \frac{-TS}{Z1} + \frac{RS}{Z2} \right)$$

$$TSE = A(TS - Z1/Z2 \, RS)$$

and the magnitude of the signal RSE is given by the equation:

$$RSE = -AZ1' \left( \frac{RS + RN}{Z1'} + \frac{-RN}{Z3'} + \frac{-TS - TN}{Z2'} + \frac{TN}{Z4'} \right)$$

$$RSE = -AZ1' \left( \frac{RS}{Z1'} - \frac{TS}{Z2'} \right) \quad (2)$$

$$RSE = A(-RS + Z1/Z2 \; TS)$$

Thus, for the transmit signal to overtake the receive signal and generate a signal +TSE, the transmit signal must overcome the hysteresis Z1/Z2 and for the receive signal to overtake the transmit signal and generate a signal −RSE, the receive signal must overcome the hysteresis Z1/Z2. The ratio of the impedances Z1/Z2 then is the hysteresis level with all unwanted noise signals substantially cancelled out.

Figure 3:
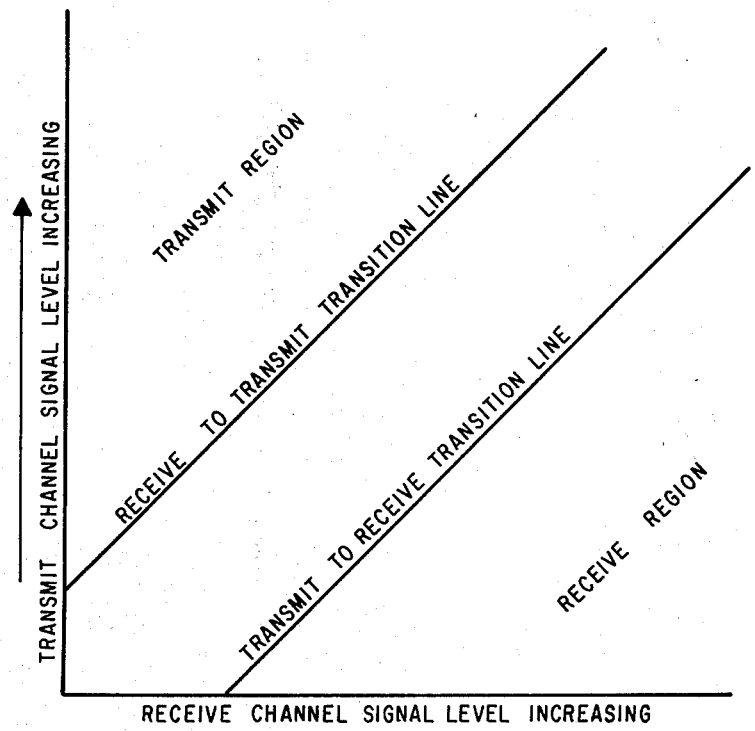
FIG. 3 is a state transition diagram illustrating the receive and transmit signal crossovers, separated by a hysteresis region of the loudspeaking telephone system illustrated in FIG. 1.

Equations 1 and 2 are graphically illustrated in FIG. 3 to point out the overtake level Z1/Z2 which is represented as the separation between the transition lines. This separation between transitions or hysteresis may be easily narrowed or widened by adjusting the ratio of the impedances Z1/Z2.

Transmit Peak Detector

Figure 4:
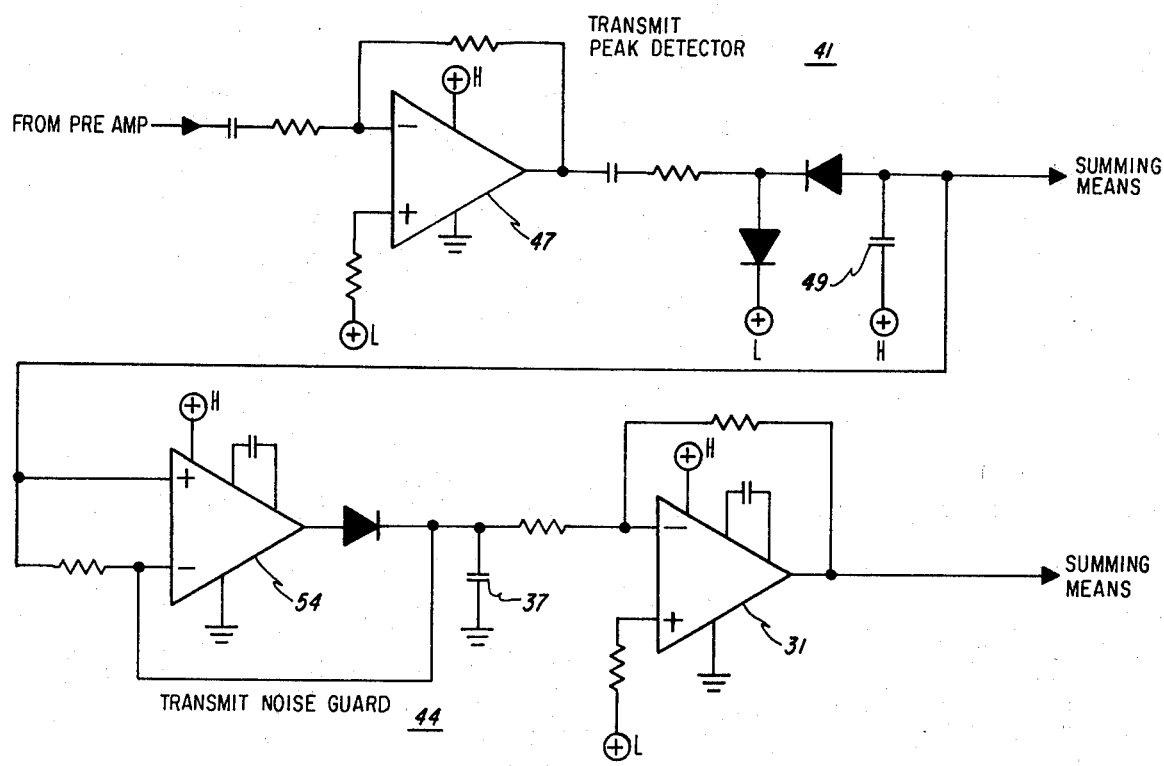
FIG. 4 is a schematic wiring diagram of the transmit peak detector and transmit noise guard circuit means of the input control circuit means illustrated in FIG. 2.

Referring now to FIG. 4, the transmit peak detector 41 provides a signal level that is substantially related to the output audio signal transmitted from the microphone pre-amplifier 20. The peak detector 41 establishes this level by charging a capacitor 49 via a voltage amplifier 47. A bias on the capacitor 49 allows the output level to the summing means R2, R5 to swing below the low supply depending upon the peak amplitude of the audio input. The steady state level for the capacitor 49 is the low voltage supply.

Receive Peak Detector

Figure 5:
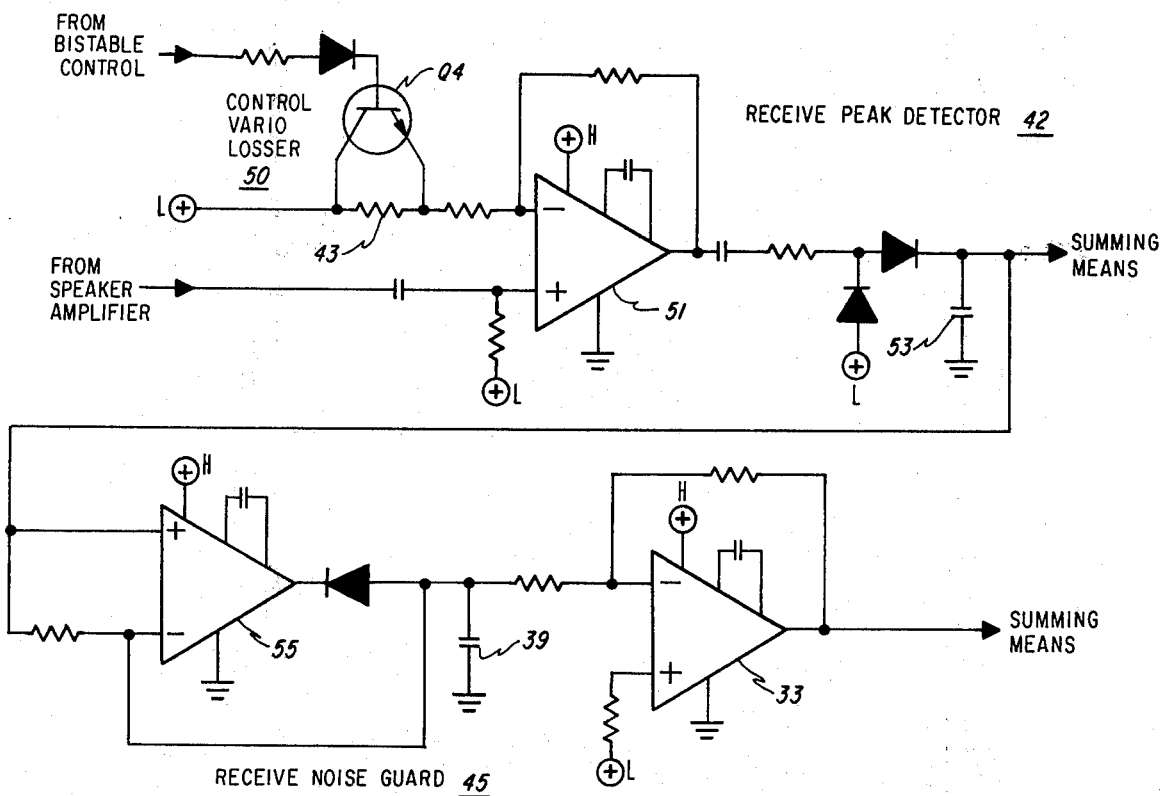
FIG. 5 is a schematic diagram of the receive peak detector and receive noise guard circuit means of the input control circuit means illustrated in FIG. 2.

Referring now to FIG. 5, the receive peak detector 42 provides a signal level that is substantially related to the output audio signal transmitted from the speaker amplifier 38. The peak detector 42 establishes this level by charging a biased capacitor 53 via a voltage amplifier 51. A bias on the capacitor 53 allows the output level to the summing means R3, R6 to swing above the low supply voltage depending upon the peak amplitude of the audio input. The steady state level for the capacitor 53 is the low voltage supply.

The differences between the circuits used in biasing the capacitors 53, 49 are provided to cause the transmit level to swing to one side of the low supply voltage and to cause the receive level to swing oppositely. The peak detectors are reversed to produce different polarities.

Control Variolosser

The control variolosser 50 shown in FIG. 5 increases the gain of the receive peak detector 42 by shunting an impedance 43 with an NPN transistor Q4. This gain increase is effected by providing a positive bias to the transistor Q4 from the bistable control circuit 16. The positive bias is also used to increase the loss of the RVL 34. The increase in gain of the receive peak detector 42 cancels the loss of signal to the control variolosser 50 caused by the switching of the RVL 34.

Transmit and Receive Noise Guard

The noise guard circuits 44, 45 in FIGS. 4 and 5, respectively, provide a signal level generally equal to the steady state noise signals contained within the transmit and receive voltage levels. The transmit and receive peak detectors 41, 42 are connected to the transmit and receive noise guard circuits 44, 45 by amplifiers 54, 55, respectively, which charge capacitors 37, 39. A slower attack time for the charging capacitors 37, 39 is used to discriminate between rapidly varying audio signals and relatively unvarying noise signals. The correct cancelling polarity is produced by the inverting amplifiers 31, 33 which each have a gain of unity. The cancelling voltage is used to eliminate the noise parameters from both summing circuits R1–R4, R5–R8 via impedances R1, R6.

It will be understood by those skilled in the art that numerous variations and modifications may be made in the preferred embodiment without departing from the spirit and scope of the invention as hereinafter claimed.

What is claimed is:

1. In a loudspeaking telephone system including transmission and receiving channels, a control circuit for switching between said transmission and receiving channels, selection control means responsive to transmit and receive seizure commands for effectively selecting between said transmission and receiving channels, respectively, by degrading the gain of the unselected channel, input control means for producing said receive seizure commands and said transmit seizure commands, said input control means including receive comparator means and transmit comparator means responsive to receive trigger signals and transmit trigger signals, respectively, for producing, respectively, receive and transmit seizure commands, and passive receive and transmit summing means, having output lines connected to said receive and transmit comparator means, respectively, and each being connected to directly compare the signal levels in both of said transmission and said receiving channels, said receive summing means being arranged to generate over its output line a receive trigger signal when the signal level in said receiving channel exceeds the signal level in said transmission channel by a predetermined amount of said transmit summing means being arranged to generate over its output a transmit trigger signal when the signal level in said transmission channel exceeds the signal level in said receiving channel by said predetermined amount, the improvement comprising:

transmit noise guard circuit means connected to the transmit summing means and to the receive summing means for substantially cancelling ambient noise parameters in said transmission channel, and receive noise guard circuit means connected to the transmit summing means and to the receive summing means for substantially cancelling noise parameters and a hybrid parameter in said receiving channel, said receive and transmit summing means each comprising a plurality of unequal impedances connected to perform an analog addition of the signal levels in said transmission and receiving channels across each said summing means, said unequal impedances being further connected to perform an analog addition of signals produced by said transmit and receive noise guard circuit means across each said summing junction, said transmit channel being connected to said transmit summing means by a first impedance, said receive channel signal being connected to said transmit summing means by a second impedance, said transmit noise guard circuit signal being connected to said transmit summing means by a third impedance, said receive noise guard circuit signal being connected to said transmit summing means by a fourth impedance, said receive channel signal being connected to said receive summing means by a fifth impedance, said transmit channel signal being connected to said receive summing means by a sixth impedance, said receive noise guard circuit signal being connected to said receive summing means by a seventh impedance, and said transmit noise guard circuit signal being connected to said receive summing means by an eighth impedance, said first, third, fifth and seventh impedances being equal to each other, said second, fourth, sixth and eighth impedances being equal to each other, and said first impedance being greater than said second impedance.

2. A loudspeaking telephone system as defined in claim 1 wherein said first through eighth impedances are resistances and said predetermined level is substantially proportional to the ratio of said first and second impedances.

3. A loudspeaking telephone system as defined in claim 2 wherein said receive noise guard circuit means and said transmit noise guard circuit means are identical and include a charging capacitor for developing a voltage substantially related to noise parameters contained in said transmit and receive channel signals and an inverting amplifier of unity gain for reversing the polarity of said voltage and then presenting said voltage to said transmit and receive summing means.

4. A loudspeaking telephone system as defined in claim 3 wherein said charging capacitor has an attack time of greater than 1 second.

5. A loudspeaking telephone system as defined in claim 4 wherein said charging capacitor has an attack time of less than 5 seconds.

* * * * *